United States Patent
Qin et al.

(10) Patent No.: US 9,723,638 B2
(45) Date of Patent: Aug. 1, 2017

(54) METHOD FOR ESTABLISHING NETWORKING CONNECTION

(71) Applicant: Realtek Semiconductor Corp., Hsinchu (TW)

(72) Inventors: Jun-Jie Qin, Suzhou (CN); Hong-Feng Shi, Suzhou (CN); Quan Yang, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 147 days.

(21) Appl. No.: 14/584,758

(22) Filed: Dec. 29, 2014

(65) Prior Publication Data

US 2015/0215972 A1    Jul. 30, 2015

(30) Foreign Application Priority Data

Jan. 24, 2014  (CN) .......................... 2014 1 0036109

(51) Int. Cl.
| | |
|---|---|
| *H04W 48/20* | (2009.01) |
| *H04W 84/12* | (2009.01) |
| *H04W 88/06* | (2009.01) |
| *H04W 48/16* | (2009.01) |
| *H04W 76/02* | (2009.01) |

(52) U.S. Cl.
CPC .......... *H04W 76/02* (2013.01); *H04W 48/16* (2013.01); *H04W 48/20* (2013.01); *H04W 84/12* (2013.01); *H04W 88/06* (2013.01)

(58) Field of Classification Search
CPC ..... H04W 84/12; H04W 48/20; H04W 88/06; H04W 48/16; H04W 76/02; H04L 63/20; H04L 67/306; H04L 63/0428
See application file for complete search history.

(56) References Cited

U.S. PATENT DOCUMENTS

| 8,072,993 B2 | 12/2011 | Wentink et al. | |
|---|---|---|---|
| 2005/0050318 A1* | 3/2005 | Alone | ................. H04L 63/0428 713/155 |
| 2007/0082699 A1* | 4/2007 | Karaoguz | .......... H04L 41/0843 455/553.1 |

FOREIGN PATENT DOCUMENTS

| JP | 2007-110190 A | 4/2007 |
|---|---|---|
| TW | 2013-01932 A1 | 1/2013 |

* cited by examiner

*Primary Examiner* — Ayaz Sheikh
*Assistant Examiner* — Debebe Asefa
(74) *Attorney, Agent, or Firm* — Birch, Stewart, Kolasch & Birch, LLP

(57) ABSTRACT

A method for establishing a networking connection includes: utilizing a mobile communication device to wirelessly communicate with a wireless access point to establish a networking connection between the mobile communication device and the wireless access point; utilizing the mobile communication device to encode a profile of a wireless local area network (WLAN) corresponding to the wireless access point to generate one or more profile encoded packets; utilizing the mobile communication device to transmit the one or more profile encoded packets; utilizing a wireless communication device to receive the one or more profile encoded packets; utilizing the wireless communication device to parse the one or more profile encoded packets to obtain the profile of the WLAN; and utilizing the wireless communication device to connect to the wireless access point according to the profile of the WLAN to establish a networking connection between the wireless communication device and the wireless access point.

12 Claims, 3 Drawing Sheets

METHOD FOR ESTABLISHING NETWORKING CONNECTION

CROSS-REFERENCE TO RELATED APPLICATIONS

This application claims the benefit of priority to Patent Application No. 201410036109.0, filed in China on Jan. 24, 2014; the entirety of which is incorporated herein by reference for all purposes.

BACKGROUND

The disclosure generally relates to a method for establishing a networking connection and, more particularly, to a method for establishing a networking connection between a wireless device and a wireless access point.

As different kinds of Internet service are being increasingly used in various applications, wireless communication devices have become more and more diversified in terms of appearance and more and more compact in size. Some input devices (such as the computer mouse, keyboard, and touch panel) and even display devices have been omitted from many wireless communication devices, because they not only require more complex circuitry in implementations but also occupy more space. In this situation, a user is not allowed to directly configure the profile of a wireless local area network (WLAN) corresponding to a wireless access point into the wireless communication device through the aforementioned input devices. Moreover, even if the wireless communication device has the capability to automatically detect available wireless access points, the wireless communication is not capable of displaying detected wireless access points on the display device for the user to select because the wireless communication is equipped with no display device. Apparently, it is troublesome for the user to connect the wireless communication device to an available wireless access point in the WALN.

SUMMARY

An example embodiment of a method for establishing a networking connection between a wireless communication device and a wireless access point is disclosed, comprising: utilizing a mobile communication device to wirelessly communicate with the wireless access point to establish a networking connection between the mobile communication device and the wireless access point; utilizing the mobile communication device to encode a profile of a wireless local area network (WLAN) corresponding to the wireless access point to generate one or more profile encoded packets; utilizing the mobile communication device to transmit the one or more profile encoded packets; utilizing the wireless communication device to receive the one or more profile encoded packets; utilizing the wireless communication device to parse the one or more profile encoded packets to obtain the profile of the WLAN; and utilizing the wireless communication device to connect to the wireless access point according to the profile of the WLAN to establish a networking connection between the wireless communication device and the wireless access point.

Another example embodiment of a method for establishing a networking connection between a wireless communication device and a wireless access point is disclosed, comprising: utilizing the wireless access point to encode a profile of a wireless local area network (WLAN) corresponding to the wireless access point to generate one or more profile encoded packets; utilizing the wireless access point to transmit the one or more profile encoded packets; utilizing the wireless communication device to receive the one or more profile encoded packets; utilizing the wireless communication device to parse the one or more profile encoded packets to obtain the profile of the WLAN; and utilizing the wireless communication device to connect to the wireless access point according to the profile of the WLAN to establish a networking connection between the wireless communication device and the wireless access point.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
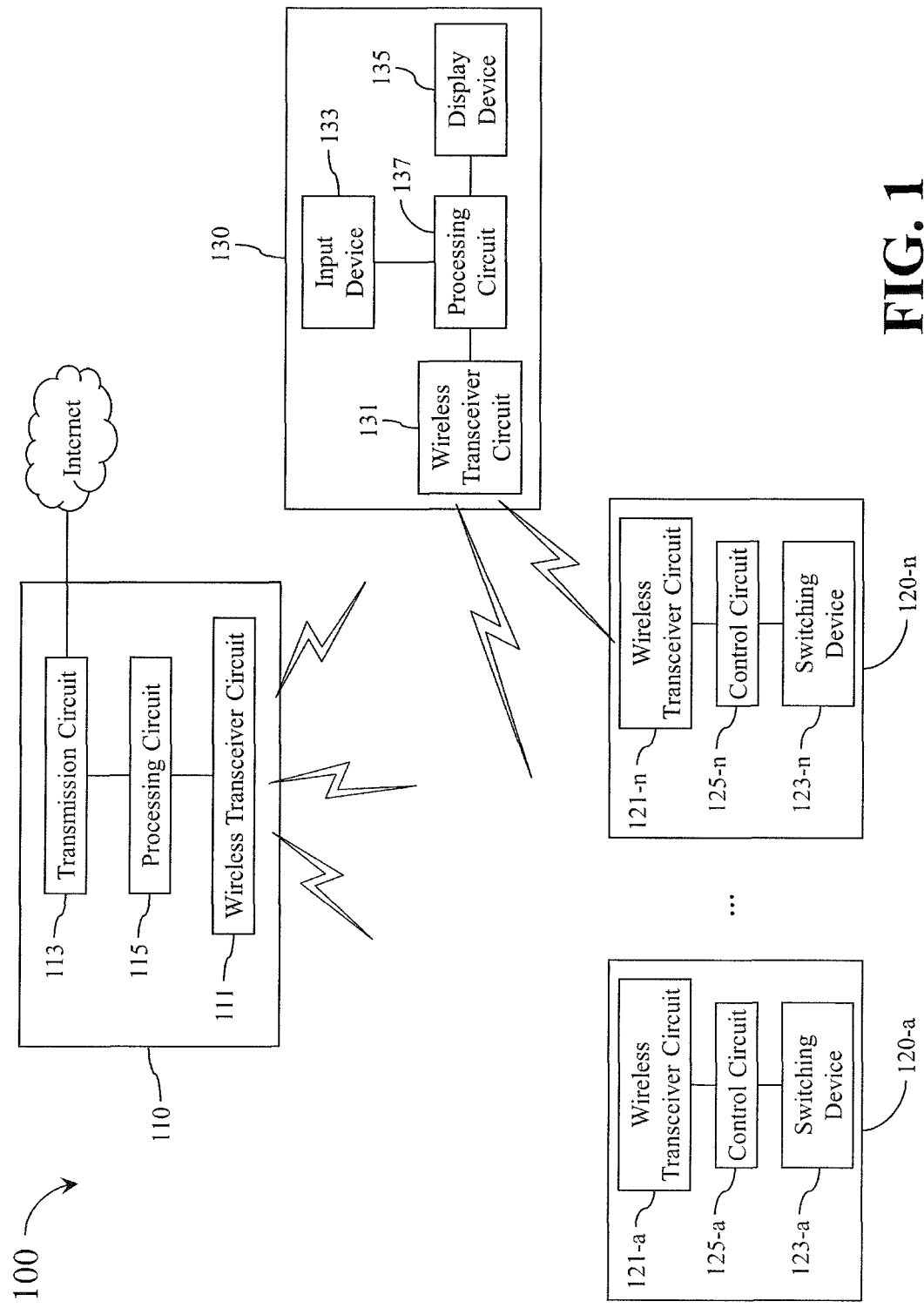
FIG. 1 shows a simplified functional block diagram of a WLAN according to one embodiment of the present disclosure.

FIG. 1 shows a simplified functional block diagram of a WLAN (wireless local area network) 100 according to one embodiment of the present disclosure. The WLAN 100 comprises a wireless access point 110, multiple wireless communication devices (e.g., the example wireless communication devices 120-a~120-n shown in FIG. 1), and a mobile communication device 130. Each of the wireless communication devices 120-a~120-n and the mobile communication device 130 is capable of connecting to the Internet through the wireless access point 110.

In the embodiment of FIG. 1, the wireless access point 110 comprises a wireless transceiver circuit 111, a transmission circuit 113, and a processing circuit 115. The wireless communication device 120 comprises a wireless transceiver circuit 121, a switching device 123, and a control circuit 125. The mobile communication device 130 comprises a wireless transceiver circuit 131, an input device 133, a display device 135, and a processing circuit 137.

Throughout the specification and drawings, indexes a~n may be used in the reference numbers of components and devices for ease of referring to respective components and devices. The use of indexes a~n does not intend to restrict the amount of components and devices to any specific number. In the specification and drawings, if a reference number of a particular component or device is used without having the index, it means that the reference number is used to refer to any unspecific component or device of corresponding component group or device group. For example, the reference number 121-a is used to refer to the specific wireless transceiver circuit 121-a, and the reference number 121 is used to refer to any unspecific wireless transceiver circuit of the wireless transceiver circuit 121-a~121-n. In another example, the reference number 120-a is used to refer to the specific wireless communication device 120-a, and the reference number 120 is used to refer to any unspecific wireless communication device of the wireless communication devices 120-a~120-n.

In the wireless access point 110, the wireless transceiver circuit 111 is configured to operably communicate data with the wireless communication devices 120-a~120-n and the mobile communication device 130. The transmission circuit 113 is configured to operably communicate data with the Internet. The processing circuit 115 is coupled with the wireless transceiver circuit 111 and the transmission circuit 113, and configured to operably control the operations of the wireless transceiver circuit 111 and the transmission circuit 113.

In the wireless communication device 120, the wireless transceiver circuit 121 is configured to operably communicate data with the wireless access point 110 and the mobile communication device 130. The switching device 123 is configured to operably allow the user to switch the operating mode of the wireless communication device 120. The control circuit 125 is coupled with the wireless transceiver circuit 121 and the switching device 123, and configured to operably control the operations of the wireless transceiver circuit 121. The control circuit 125 is also configured to operably switch the operating mode of the wireless communication device 120 according to the user's manipulation to the switching device 123.

In the mobile communication device 130, the wireless transceiver circuit 131 is configured to operably communicate data with the wireless access point 110 and the wireless communication devices 120-a~120-n. The input device 133 is configured to operably receive operating commands inputted by the user. The display device 135 is configured to operably display operation images or messages for the user to confirm. The processing circuit 137 is coupled with the wireless transceiver circuit 131, the input device 133, and the display device 135, and configured to operably control the operations of the wireless transceiver circuit 131, the input device 133, and the display device 135. The processing circuit 137 is further configured to operably encode profile of the WLAN 100 corresponding to the wireless access point 110 to generate one or more profile encoded packets. In addition, the processing circuit 137 is further configured to operably control the wireless transceiver circuit 131 to transmit the one or more profile encoded packets so that the wireless communication devices 120-a~120-n may receive the one or more profile encoded packets.

The aforementioned profile of the WLAN 100 refers to a SSID (service set identifier), a password, and/or an authentication type of the WLAN 100.

Each of the wireless transceiver circuit 111, 121, and 131 may be realized with a wired networking circuit, a wireless networking circuit, or a hybrid circuit integrated with the functionalities of the above two circuits. Each of the processing circuit 115, 137, and the control circuit 125 may be realized with one or more processor units. The switching device 123 may be realized with any kind of button or switch. The input device 133 may be realized with a remote control, a touch screen, a touch pad, a keyboard, a computer mouse, a voice control device, a posture sensing device, other circuit adopting appropriate command generating technologies, or a combination of the aforementioned devices. In addition the display device 135 may be realized with any display screen or projector, and may be integrated with the input device 133 to form a touch screen.

In practice, the wireless communication device 120 may be realized with any device capable of connecting to the Internet, such as a USB dongle, a wireless communication socket, a wireless communication chip, or the like. The mobile communication device 130 may be realized with any hand-held device capable of connecting to the Internet and capable of displaying images, such as a tablet computer, a notebook computer, or a netbook computer, an electronic book, or a hand-held game console. For convenience of illustration, other elements in the wireless access point 110, the wireless communication device 120, and the mobile communication device 130 and their connection relationship are not shown in FIG. 1.

Figure 2:
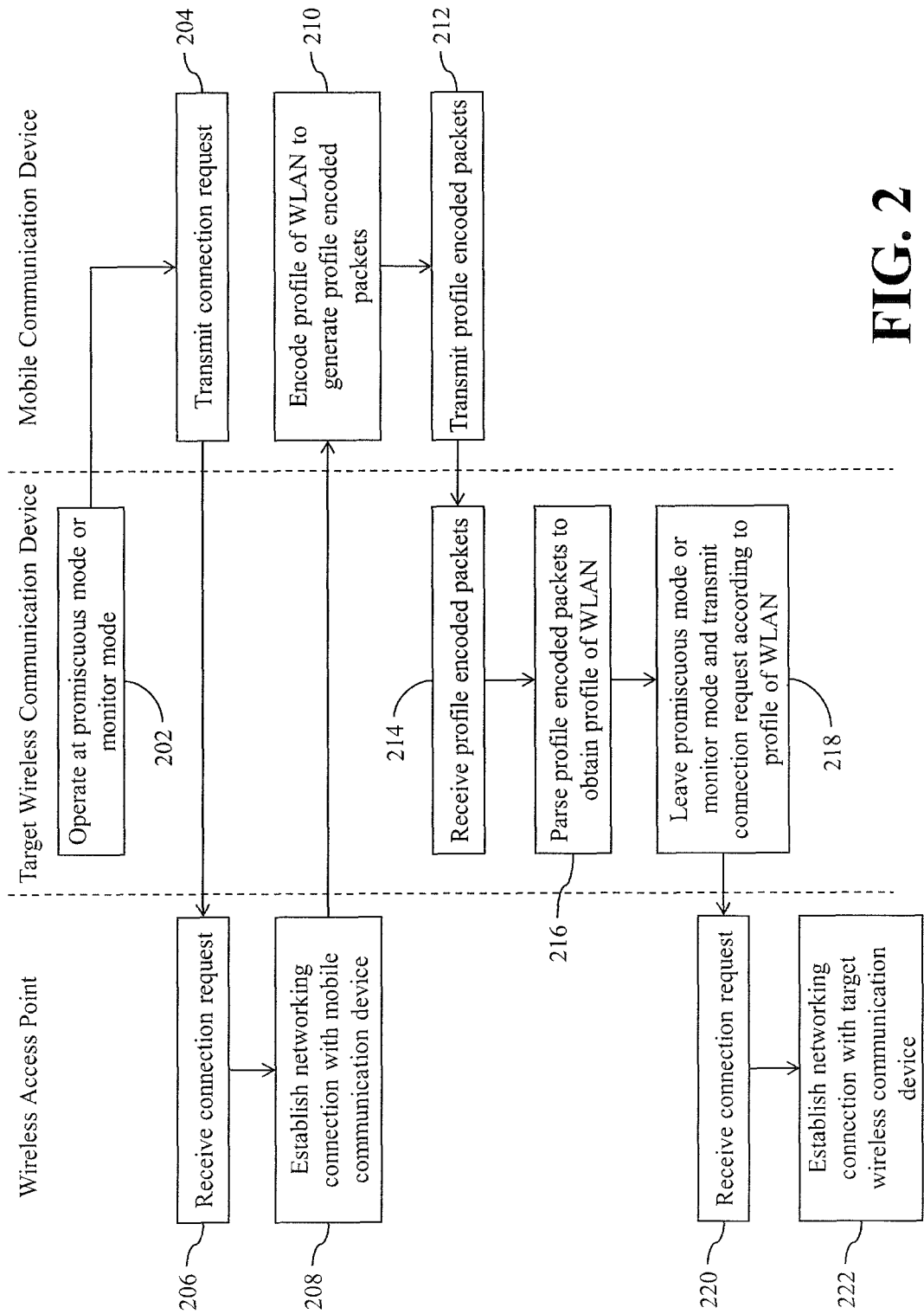
FIG. 2 and FIG. 3 show simplified flowcharts of methods for establishing networking connections according to different embodiments of the present disclosure.

The operations of the WLAN 100 will be further described in the following by reference to FIG. 2. FIG. 2 shows a simplified flowchart of a method for establishing networking connections according to one embodiment of the present disclosure.

In FIG. 2 and subsequent flowcharts, operations within a column under the name of a specific device are operations to be performed by the specific device. For example, in FIG. 2, operations within a column under the label "wireless access point" are operations to be performed by the wireless access point 110, operations within a column under the label "target wireless communication device" are operations to be performed by one of the wireless communication devices 120-a~120-n, and operations within a column under the label "mobile communication device" are operations to be performed by the mobile communication device 130.

When the user want to connect a target wireless communication device of the wireless communication devices 120-a~120-n to the wireless access point 110, the user may perform the operation 202 to switch the operating mode of the target wireless communication device to be a promiscuous mode or a monitor mode. In practice, the user may utilize the switching device 123 of the target wireless communication device to switch the operating mode of the target wireless communication device. For illustrative purpose, it is herein assumed that the target wireless communication device is the wireless communication device 120-a. In the operation 202, the control circuit 125-a of the wireless communication device 120-a configures the wireless communication device 120-a to operate at the promiscuous mode or the monitor mode according to the user's manipulation to the switching device 123-a.

On the other hand, the user may utilize the mobile communication device 130 to wirelessly communicate with the wireless access point 110 to establish a networking connection between the mobile communication device 130 and the wireless access point 110.

For example, the user may perform the operation 204 to manipulate the input device 133 of the mobile communication device 130 so as to instruct the mobile communication device 130 to transmit a connection request to the wireless access point 110 in order to request the wireless access point 110 to establish a networking connection with the mobile communication device 130. In this situation, the processing circuit 137 of the mobile communication device 130 controls the wireless transceiver circuit 131 to transmit a first connection request to the wireless access point 110.

In the operation 206, the wireless transceiver circuit 111 of the wireless access point 110 receives the first connection request transmitted from the mobile communication device 130.

In the operation 208, the processing circuit 115 controls the wireless transceiver circuit 111 to establish a networking connection with the mobile communication device 130 according to the first connection request.

After the networking connection between the wireless access point 110 and the mobile communication device 130 is established, the user may utilize the mobile communication device 130 to encode the profile of the WLAN 100 corresponding to the wireless access point 110 to generate one or more profile encoded packets.

For example, the user may perform the operation 210 to manipulate the input device 133 of the mobile communication device 130 so as to instruct the mobile communication device 130 to encode the profile of the WLAN 100 to generate the one or more profile encoded packets. While the user manipulates the input device 133, the processing circuit 137 may display messages related to the wireless access point 110 or the WLAN 100 on the display device 135 so that the user is allowed to check the correctness of the manipulations.

In practice, the processing circuit 137 may divide the profile of the WLAN 100 into multiple data segments in the operation 210, and respectively encode the multiple data segments in destination address fields of the one or more profile encoded packets. For example, the processing circuit 137 may encode a first data segment of the multiple data segments into a destination address field of one profile encoded packet; encode a second data segment of the multiple data segments into a destination address field of another profile encoded packet; and so forth. In practice, the processing circuit 137 may encrypt the profile of the WLAN 100 and divide the encrypted result into multiple data segments, and then encode the multiple data segments into the destination address fields of multiple profile encoded packets in the manner described above. The aforementioned destination address field may be the destination MAC address field in the profile encoded packet.

In another embodiment, the processing circuit 137 may divide the profile of the WLAN 100 into multiple data segments in the operation 210, and respectively adjust payload lengths of the one or more profile encoded packets to respectively represent the contents of the multiple data segments. For example, the processing circuit 137 may convert a first data segment of the multiple data segments into a first predetermined length and adjust the payload length of one profile encoded packet to be the first predetermined length; convert a second data segment of the multiple data segments into a second predetermined length and adjust the payload length of another profile encoded packet to be the second predetermined length; and so forth. In practice, the processing circuit 137 may encrypt the profile of the WLAN 100 and divide the encrypted result into multiple data segments, and then encode the multiple data segments into the payload lengths of multiple profile encoded packets in the manner described above.

In another embodiment, the processing circuit 137 may divide the profile of the WLAN 100 into multiple data segments in the operation 210, and encode the multiple data segments into the payload lengths of the one or more profile encoded packets and also into the destination address fields of the one or more profile encoded packets. For example, the processing circuit 137 may respectively adjust the payload lengths of the one or more profile encoded packets to respectively represent the contents of some data segments, and encode the other data segments into the destination address fields of the one or more profile encoded packets.

Then, the user may utilize the mobile communication device 130 to transmit the one or more profile encoded packets. In this situation, the processing circuit 137 performs the operation 212 to control the wireless transceiver circuit 131 to transmit the one or more profile encoded packets.

At this moment, the wireless communication device 120-*a* receives all packets in the air since it is operating under the promiscuous mode or the monitor mode. Accordingly, in the operation 214, the wireless transceiver circuit 121-*a* of the wireless communication device 120-*a* receives the one or more profile encoded packets transmitted from the mobile communication device 130.

Then, the control circuit 125-*a* of the wireless communication device 120-*a* performs the operation 216 to parse the one or more profile encoded packets received by the wireless transceiver circuit 121-*a* to obtain the profile of the WLAN 100.

Once the control circuit 125-*a* obtains the profile of the WLAN 100, the control circuit 125-*a* performs the operation 218 to leave the promiscuous mode or the monitor mode and to generate a second connection request according to the profile of the WLAN 100. In the operation 218, the control circuit 125-*a* further controls the wireless transceiver circuit 121-*a* to transmit the second connection request to the wireless access point 110 so as to request the wireless access point 110 to establish a networking connection with the wireless communication device 120-*a*.

In the operation 220, the wireless transceiver circuit 111 of the wireless access point 110 receives the second connection request transmitted from the wireless communication device 120-*a*.

In the operation 222, the processing circuit 115 controls the wireless transceiver circuit 111 to establish a networking connection with the wireless communication device 120-*a* according to the second connection request.

It can be appreciated from the foregoing descriptions, even if the wireless communication device 120 is equipped with no display device and input device, the user is still allowed to utilize the mobile communication device 130 to be an intermediate device for transmitting the profile of the WLAN 100 to the wireless communication device 120, so as to easily establish a networking connection between the wireless communication device 120 and the wireless access point 110. In other words, the hardware architecture and volume of the wireless communication device 120 can be effectively reduced by adopting the aforementioned method.

Some traditional wireless communication devices and wireless access points allow the user to configure the connection between the wireless communication device and the wireless access point by pressing a WPS (Wi-Fi Protected Setup) button on the device. This configuration approach seems easy to accomplish, but it causes inconvenience in many situations. For example, in the case where the wireless communication device and the wireless access point are located far away from each other, the user has to move a long distance to conduct the configuration. In addition, in the case where the wireless communication device or the wireless access point is located in a place that is difficult to reach (such as located in a high position or inside a wiring box) or blocked by other objects, it would be difficult for the user to press the WPS button. In comparison, even if the disclosed wireless access point 110 and wireless communication device 120 are located far away from each other or the wireless access point 110 and the wireless communication device 120 are located in the places that are difficult to reach, the user is still allowed to utilize the mobile communication device 130 as an intermediate device to transmit the profile of the WLAN 100 to the wireless communication device 120. As a result, the networking connection between the wireless communication device 120 and the wireless access point 110 can be easily established. Accordingly, the disclosed method effectively improves the convenience to the user in configuring the networking connection between the wireless communication device 120 and the wireless access point 110.

Furthermore, since the mobile communication device 130 transmits the one or more profile encoded packets through a shared medium (i.e., the air), the one or more profile encoded packets may thus be received by any wireless communication device 120 that operates at the promiscuous mode or the monitor mode. Therefore, as long as the control circuit 125-*a*~125-*n* of the wireless communication devices 120-*a*~120-*n* are preinstalled with driver programs that are capable of correcting parsing the one or more profile encoded packets, the wireless communication devices 120-*a*~120-*n* are enabled to simultaneously obtain the profile of the WLAN 100 while the mobile communication device 130 transmits the one or more profile encoded packets. In other words, the disclosed method allows the user to utilize the mobile communication device 130 to simultaneously transmit the profile of the WLAN 100 to the multiple wireless communication devices 120-*a*~120-*n*, so as to accomplish the networking configurations of the multiple wireless communication devices 120-*a*~120-*n* at the same time. That is, another advantage of the disclosed embodiment is that the profile of the WLAN 100 would be simultaneously transmitted to the multiple wireless communication devices 120-*a*~120-*n* and thus the networking connection between the wireless access point 110 and each of the multiple wireless communication devices 120-*a*~120-*n* can be established at the same time, thereby significantly increasing the convenience and efficiency in setting up the networking configurations of the wireless communication devices 120-*a*~120-*n*.

Another operation approach of the WLAN 100 will be further described in the following by reference to FIG. 3.

Figure 3:
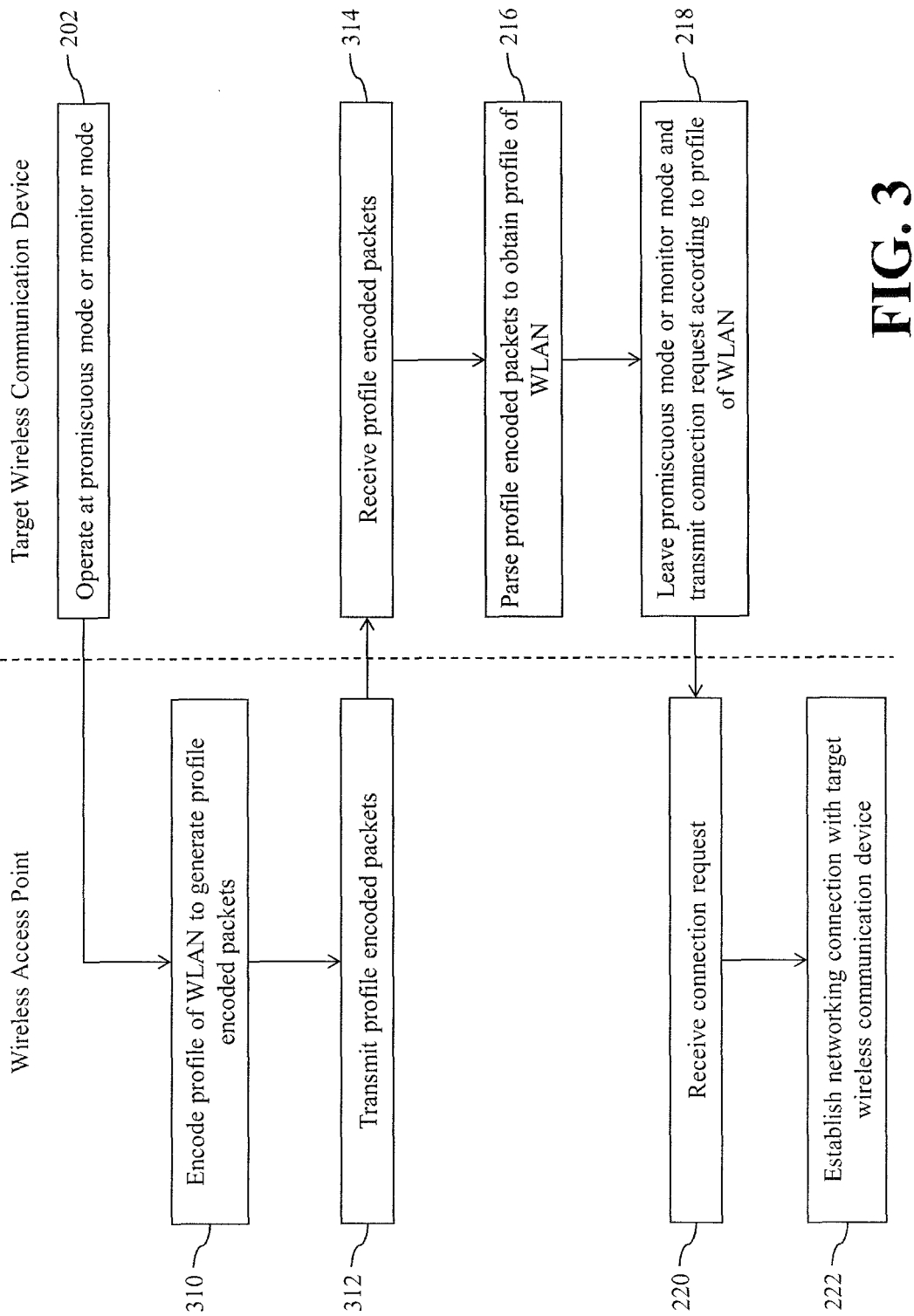

FIG. 3 shows a simplified flowchart of a method for establishing networking connections according to another embodiment of the present disclosure. For illustrative purpose, it is herein assumed again that the target wireless communication device is the wireless communication device 120-*a*.

When the user want to connect the wireless communication device 120-*a* to the wireless access point 110, the user may perform the aforementioned operation 202 to switch the operating mode of the wireless communication device 120-*a* to be the promiscuous mode or the monitor mode.

On the other hand, the user may utilize the wireless access point 110 to encode the profile of the WLAN 100 corresponding to the wireless access point 110 to generate one or more profile encoded packets.

For example, the user may perform the operation 310 to manipulate the wireless access point 110 so as to instruct the wireless access point 110 to encode the profile of the WLAN 100 to generate the one or more profile encoded packets. In the operation 310, the user may directly manipulate the wireless access point 110 or indirectly trigger the wireless access point 110 to perform the operation 310 through other device.

In practice, the processing circuit 115 of the wireless access point 110 may divide the profile of the WLAN 100 into multiple data segments in the operation 310, and respectively encode the multiple data segments into the destination address fields of the one or more profile encoded packets, or into the source address fields of the one or more profile encoded packets, or into both the destination address fields and the source address fields of the one or more profile encoded packets. For example, the processing circuit 115 may encode a first data segment of the multiple data segments into the source address field of one profile encoded packet; encode a second data segment of the multiple data segments into the source address field of another profile encoded packet; and so forth. Alternatively, the processing circuit 115 may encode a first data segment of the multiple data segments into the destination address field and the source address field of one profile encoded packet; encode a second data segment of the multiple data segments into the destination address field and the source address field of another profile encoded packet; and so forth. In practice, the processing circuit 115 may encrypt the profile of the WLAN 100, divide the encrypted result into multiple data segments, and respectively encode the multiple data segments into the destination address fields of the one or more profile encoded packets, or into the source address fields of the one or more profile encoded packets, or into both the destination address fields and the source address fields of the one or more profile encoded packets in the manner described above. The aforementioned destination address field may be the destination MAC address field in the profile encoded packet, and the source address field may be the source MAC address field in the profile encoded packet.

In another embodiment, the processing circuit 115 may divide the profile of the WLAN 100 into multiple data segments in the operation 310, and respectively adjust the payload lengths of the one or more profile encoded packets to respectively represent the contents of the multiple data segments. For example, the processing circuit 115 may convert a first data segment of the multiple data segments into a first predetermined length and adjust the payload length of one profile encoded packet to be the first predetermined length; convert a second data segment of the multiple data segments into a second predetermined length and adjust the payload length of another profile encoded packet to be the second predetermined length; and so forth. In practice, the processing circuit 115 may encrypt the profile of the WLAN 100 and divide the encrypted result into multiple data segments, and then encode the multiple data segments into the payload lengths of multiple profile encoded packets in the manner described above.

In another embodiment, the processing circuit 115 may divide the profile of the WLAN 100 into multiple data segments in the operation 310, and encode the multiple data segments into payload lengths of the one or more profile encoded packets and also into the destination address fields of the one or more profile encoded packets, or the source address fields of the one or more profile encoded packets, or both the destination address fields and source address fields of the one or more profile encoded packets. For example, the processing circuit 115 may respectively adjust the payload lengths of the one or more profile encoded packets to respectively represent the contents of some data segments, and encode the other data segments into the destination address fields of the one or more profile encoded packets, or the source address fields of the one or more profile encoded packets, or both the destination address fields and source address fields of the one or more profile encoded packets.

Then, the user may utilize the wireless access point 110 to transmit the one or more profile encoded packets. In this situation, the processing circuit 115 performs the operation 312 to control the wireless transceiver circuit 111 to transmit the one or more profile encoded packets.

At this moment, the wireless communication device 120-*a* receives all packets in the air since it is operating under the promiscuous mode or the monitor mode. Accordingly, in the operation 314, the wireless transceiver circuit 121-*a* of the wireless communication device 120-*a* receives the one or more profile encoded packets transmitted from the wireless access point 110.

Then, the control circuit 125-*a* of the wireless communication device 120-*a* performs the foregoing operations 216 and 218, and the wireless access point 110 performs the foregoing operations 220 and 222 to establish the networking connection between the wireless access point 110 and the wireless communication device 120-*a*.

It can be appreciated from the foregoing descriptions, even if the wireless communication device 120 is equipped with no display device and input device, the user is still allowed to utilize the wireless access point 110 to transmit the profile of the WLAN 100 to the wireless communication device 120, so as to easily establish a networking connection between the wireless communication device 120 and the wireless access point 110. In other words, the hardware architecture and volume of the wireless communication device 120 can be effectively reduced by adopting the aforementioned method.

In addition, even if the disclosed wireless access point 110 and wireless communication device 120 are located far away from each other or the wireless communication device 120 are located in a places that is difficult to reach, the user is still allowed to utilize the wireless access point 110 as an intermediate device to transmit the profile of the WLAN 100 to the wireless communication device 120. As a result, the networking connection between the wireless communication device 120 and the wireless access point 110 can be easily established. Accordingly, in comparison with the prior art approach that sets up the networking configuration between the traditional wireless access point and wireless communication device by pressing the WPS button, the method disclosed in this disclosure effectively improves the convenience to the user in configuring the networking connection between the wireless communication device 120 and the wireless access point 110.

Furthermore, since the wireless access point 110 transmits the one or more profile encoded packets through a shared medium (i.e., the air), the one or more profile encoded packets may thus be received by any wireless communication device 120 that operates at the promiscuous mode or the monitor mode. Therefore, as long as the control circuit 125-*a*~125-*n* of the wireless communication devices 120-*a*~120-*n* are preinstalled with driver programs that are capable of correcting parsing the one or more profile encoded packets, the wireless communication devices 120-*a*~120-*n* are enabled to simultaneously obtain the profile of the WLAN 100 while the wireless access point 110 transmits the one or more profile encoded packets. In other words, the disclosed method allows the user to utilize the wireless access point 110 to simultaneously transmit the profile of the WLAN 100 to the multiple wireless communication devices 120-*a*~120-*n*, so as to accomplish the networking configurations of the multiple wireless communication devices 120-*a*~120-*n* at the same time. That is, another advantage of the disclosed embodiment is that the profile of the WLAN 100 would be simultaneously transmitted to the multiple wireless communication devices 120-*a*~120-*n* and thus the networking connection between the wireless access point 110 and each of the multiple wireless communication devices 120-*a*~120-*n* can be established at the same time, thereby significantly increasing the convenience and efficiency in setting up the networking configurations of the wireless communication devices 120-*a*~120-*n*.

In comparison with the embodiment of FIG. 2, the method illustrated in FIG. 3 may further omit the mobile communication device 130, and thus further simplify the architecture of the WLAN.

Please note that the execution order of the operations in FIG. 2 and FIG. 3 is merely an exemplary embodiment, rather than restriction to the practical implementations. For example, in FIG. 2, the operation 202 may be instead performed between the operations 204 and 212, may be performed after the operation 212, or may be performed along with the operation 212. Similarly, in FIG. 3, the operation 202 may be instead performed between the operations 310 and 312, may be performed after the operation 312, or may be performed along with the operation 312.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A method for establishing a networking connection between a wireless communication device and a wireless access point, the method comprising:
   utilizing a mobile communication device to wirelessly communicate with the wireless access point to establish a networking connection between the mobile communication device and the wireless access point;
   utilizing the mobile communication device to encode a profile of a wireless local area network (WLAN) corresponding to the wireless access point to generate one or more profile encoded packets without communicating with the wireless communication device in advance;
   utilizing the mobile communication device to transmit the one or more profile encoded packets;
   utilizing the wireless communication device to receive the one or more profile encoded packets;
   utilizing the wireless communication device to parse the one or more profile encoded packets to obtain the profile of the WLAN; and
   utilizing the wireless communication device to connect to the wireless access point according to the profile of the WLAN to establish a networking connection between the wireless communication device and the wireless access point.

2. The method of claim 1, wherein the profile of the WLAN comprises at least one of a service set identifier (SSID) and a password of the WLAN, and the operation of utilizing the wireless communication device to receive the one or more profile encoded packets comprises:

configuring the wireless communication device to operate at a promiscuous mode or a monitor mode so as to receive the one or more profile encoded packets.

3. The method of claim 2, wherein the operation of utilizing the mobile communication device to encode the profile of the WLAN to generate the one or more profile encoded packets comprises:

utilizing the mobile communication device to divide the profile of the WLAN into multiple data segments, and respectively encoding the multiple data segments into destination MAC address fields of the one or more profile encoded packets.

4. The method of claim 2, wherein the operation of utilizing the mobile communication device to encode the profile of the WLAN to generate the one or more profile encoded packets comprises:

utilizing the mobile communication device to divide the profile of the WLAN into multiple data segments, and respectively adjusting payload lengths of the one or more profile encoded packets to respectively represent contents of the multiple data segments.

5. The method of claim 2, wherein the operation of utilizing the mobile communication device to encode the profile of the WLAN to generate the one or more profile encoded packets comprises:

utilizing the mobile communication device to divide the profile of the WLAN into multiple data segments, and encoding the multiple data segments into payload lengths of the one or more profile encoded packets and into destination MAC address fields of the one or more profile encoded packets.

6. The method of claim 1, wherein the wireless communication device has no display device for displaying the profile of the WLAN.

7. A method for establishing a networking connection between a wireless communication device and a wireless access point, the method comprising:

utilizing the wireless access point to encode a profile of a wireless local area network (WLAN) corresponding to the wireless access point to generate one or more profile encoded packets without communicating with the wireless communication device in advance;

utilizing the wireless access point to transmit the one or more profile encoded packets;

utilizing the wireless communication device to receive the one or more profile encoded packets;

utilizing the wireless communication device to parse the one or more profile encoded packets to obtain the profile of the WLAN; and utilizing the wireless communication device to connect to the wireless access point according to the profile of the WLAN to establish a networking connection between the wireless communication device and the wireless access point.

8. The method of claim 7, wherein the profile of the WLAN comprises at least one of a service set identifier (SSID) and a password of the WLAN, and the operation of utilizing the wireless communication device to receive the one or more profile encoded packets comprises:

configuring the wireless communication device to operate at a promiscuous mode or a monitor mode so as to receive the one or more profile encoded packets.

9. The method of claim 8, wherein the operation of utilizing the wireless access point to encode the profile of the WLAN to generate the one or more profile encoded packets comprises:

utilizing the wireless access point to divide the profile of the WLAN into multiple data segments, and respectively encoding the multiple data segments into destination MAC address fields of the one or more profile encoded packets, or into source MAC address fields of the one or more profile encoded packets, or into both the destination MAC address fields and the source MAC address fields of the one or more profile encoded packets.

10. The method of claim 8, wherein the operation of utilizing the wireless access point to encode the profile of the WLAN to generate the one or more profile encoded packets comprises:

utilizing the wireless access point to divide the profile of the WLAN into multiple data segments, and respectively adjusting payload lengths of the one or more profile encoded packets to respectively represent contents of the multiple data segments.

11. The method of claim 8, wherein the operation of utilizing the wireless access point to encode the profile of the WLAN to generate the one or more profile encoded packets comprises:

utilizing the wireless access point to divide the profile of the WLAN into multiple data segments, and encoding the multiple data segments into payload lengths of the one or more profile encoded packets and also into destination MAC address fields of the one or more profile encoded packets, or source MAC address fields of the one or more profile encoded packets, or both the destination MAC address fields and the source MAC address fields of the one or more profile encoded packets.

12. The method of claim 7, wherein the wireless communication device has no display device for displaying the profile of the WLAN.

* * * * *